United States Patent
Welch et al.

(10) Patent No.: US 9,255,546 B2
(45) Date of Patent: Feb. 9, 2016

(54) CASCADE-STYLE VARIABLE AREA FAN DUCT NOZZLE

(75) Inventors: John M. Welch, Wichita, KS (US);
Thomas Scott, Wichita, KS (US);
Michael P. Urban, Wichita, KS (US);
Matthew Tymes, Wichita, KS (US)

(73) Assignee: Spirit AreoSystems, Inc., Wichita, KS (US)

( * ) Notice: Subject to any disclaimer, the term of this patent is extended or adjusted under 35 U.S.C. 154(b) by 744 days.

(21) Appl. No.: 13/591,671

(22) Filed: Aug. 22, 2012

(65) Prior Publication Data

US 2013/0200178 A1    Aug. 8, 2013

Related U.S. Application Data

(60) Provisional application No. 61/593,905, filed on Feb. 2, 2012.

(51) Int. Cl.
| F02K 1/70 | (2006.01) |
| F02K 1/09 | (2006.01) |
| F02K 1/72 | (2006.01) |
| F02K 1/62 | (2006.01) |
| F02K 1/76 | (2006.01) |

(52) U.S. Cl.
CPC ... *F02K 1/09* (2013.01); *F02K 1/72* (2013.01); *F02K 1/625* (2013.01); *F02K 1/763* (2013.01)

(58) Field of Classification Search
CPC ........... F02K 1/72; F02K 1/763; F02K 1/625; F02K 1/09

USPC ......... 60/770, 771, 226.1, 226.3; 239/265.11, 239/265.19, 265.25, 265.31, 265.33

See application file for complete search history.

(56) References Cited

U.S. PATENT DOCUMENTS

| 3,541,794 | A | * | 11/1970 | Bollenbacher et al. ...... 60/226.2 |
| 3,779,010 | A | * | 12/1973 | Chamay et al. ............. 60/226.2 |
| 3,824,784 | A | * | 7/1974 | Kitson et al. ................ 60/226.2 |
| 4,145,877 | A | * | 3/1979 | Montgomery .............. 60/226.2 |
| 4,716,724 | A | * | 1/1988 | Newton ...................... 60/226.2 |
| 4,802,629 | A | * | 2/1989 | Klees ...................... 239/265.19 |
| 5,706,649 | A | * | 1/1998 | Robinson et al. ........... 60/226.2 |
| 5,778,659 | A | | 7/1998 | Duesler et al. |
| 7,146,796 | B2 | * | 12/2006 | Lair ........................... 60/226.2 |
| 2009/0288386 | A1 | * | 11/2009 | Marshall et al. ............ 60/204 |
| 2010/0005777 | A1 | * | 1/2010 | Marshall ..................... 60/204 |
| 2010/0229527 | A1 | * | 9/2010 | Amkraut et al. ............ 60/226.2 |

* cited by examiner

*Primary Examiner* — Steven Sutherland
(74) *Attorney, Agent, or Firm* — Hovey Williams LLP

(57) ABSTRACT

An aircraft nacelle comprising an outer cowl having an inner wall and an outer wall surrounding the inner wall. The inner wall may have an inner opening formed therethrough and the outer wall may have an outer opening formed therethrough at an aft end of the nacelle. The nacelle may further comprise a translating panel configured to cover the inner and outer openings in a stowed position and to translate aft to a deployed position. The translating panel may be fixed to cascade guide vane panels which rest between the inner and outer wall in the stowed position and are exposed to airflow via the inner and outer openings when translated aft to the deployed position, thereby increasing a nozzle area of the nacelle. Guide vanes of the cascade guide vane panels are angled slightly aftward to direct the nacelle's airflow outward and aftward.

18 Claims, 6 Drawing Sheets

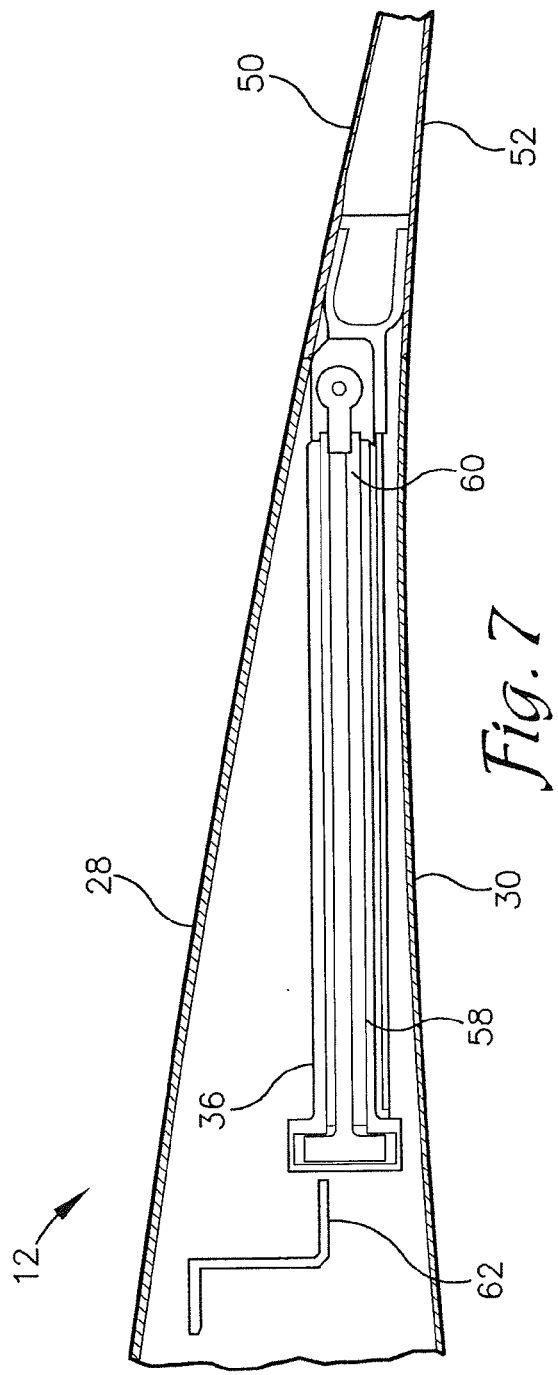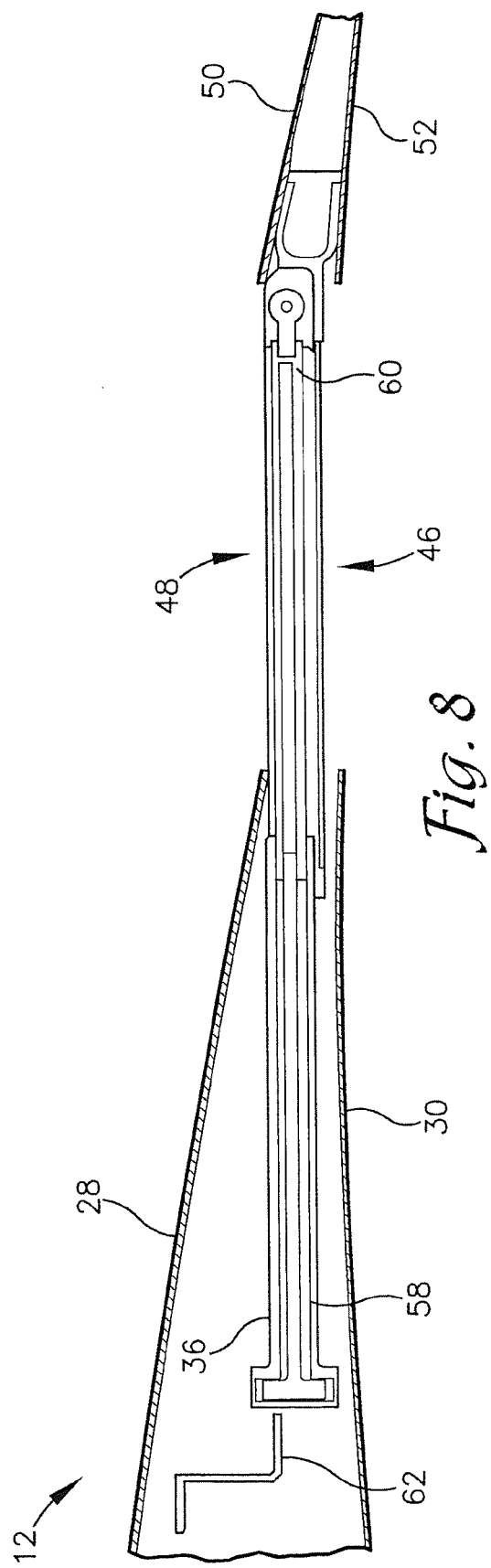

CASCADE-STYLE VARIABLE AREA FAN DUCT NOZZLE

RELATED APPLICATIONS

The present application claims priority benefit, with regard to all common subject matter, to an earlier-filed U.S. provisional patent application titled "CASCADE-VECTORED VARIABLE AREA FAN DUCT NOZZLE," Ser. No. 61/593,905, filed Feb. 2, 2012, hereby incorporated by reference in its entirety into the present application.

BACKGROUND

An aircraft nacelle is a structure that surrounds an aircraft engine and broadly includes an inner cowl surrounding the engine and an outer cowl positioned outward of the inner cowl, forming an air duct or fan duct therebetween. Air flows in a forward to aft direction through the fan duct and out through an opening at an aft end of the nacelle, sometimes referred to as a nozzle.

In some aircraft applications, it is desired to vary the area of the nozzle. For example, Variable Area Fan Duct Nozzle (VAFN) technology is used on high-bypass turbofan engines to modulate airflow and pressure within the fan duct. In a turbo fan engine there are generally two flow paths—a core and a bypass or fan duct. A majority of the air goes through the bypass and produces most of the engine's thrust. The VAFN is located in the aft portion of the bypass duct and varies fan exit nozzle area during take-off and landing via various actuation means for mechanically expanding aft openings of the nacelle or providing additional openings proximate to the aft end of the nacelle. By increasing or decreasing the effective exit area of the fan duct nozzle, several potential benefits may be realized, such as greater noise reduction or greater fuel efficiency. Varying the area may also be required to enable certain engine technology, such as geared turbofan (GTF) engines. However, the electrical and mechanical components of various VAFNs generally add undesired weight to the aircraft.

SUMMARY

Embodiments of the present invention solve the above-mentioned problems and provide a distinct advance in the art of variable nozzles for nacelles. An aircraft nacelle constructed in accordance with embodiments of the invention is configured to surround an aircraft engine and may have a forward end and an aft end opposite the forward end. The nacelle may comprise an outer cowl, a translating panel translatable forward and aft relative to the outer cowl, a cascade guide vane panel fixed to the translating panel, and an actuator configured to actuate the translating panel and the cascade guide vane panel from a stowed position to a deployed position. The outer cowl may comprise an inner wall having an inner opening formed therethrough at the aft end of the nacelle and an outer wall surrounding the inner wall and converging with the inner wall at the aft end of the nacelle. The outer wall may have an outer opening formed therethrough and positioned to correspond with the inner opening at the aft end of the nacelle. The translating panel may be configured to cover the inner and outer openings in the stowed position and to translate aftward to the deployed position. The cascade guide vane panel may comprise a plurality of guide vanes and may be positioned between the inner and outer wall when the translating panel is in the stowed position. Furthermore, the cascade guide vane panel may be positioned between the inner opening and the outer opening when the translating panel is in the deployed position. The guide vanes may be angled and configured to direct airflow from within the inner wall in an outward and aftward direction relative to the outer wall in the deployed position.

In another embodiment of the invention, the nacelle may be configured to substantially encircle an aircraft engine and may have a forward end and an aft end opposite of the forward end. The nacelle may comprise two nacelle halves each having a forward end, an aft end, a top end, and a bottom end. The two nacelle halves may be configured to attach to an aircraft pylon at the top ends of the nacelle halves and to attach with each other at the bottom ends of the nacelle halves to cooperatively encircle the aircraft engine. Each of the nacelle halves may comprise an outer cowl, a translating panel translatable forward and aft relative to the outer cowl, a cascade guide vane panel fixed to the translating panel, and an actuator configured to actuate the translating panel and the cascade guide vane panel from a stowed position to a deployed position. The outer cowl may comprise an inner wall having an inner opening formed therethrough at the aft end of the nacelle and an outer wall surrounding the inner wall and converging with the inner wall at the aft end of the nacelle. The outer wall may have an outer opening formed therethrough and positioned to correspond with the inner opening at the aft end of the nacelle. The translating panel may be configured to cover the inner and outer openings in the stowed position and to translate aftward to the deployed position. The cascade guide vane panel may comprise a plurality of guide vanes and may be positioned between the inner and outer wall when the translating panel is in the stowed position. Furthermore, the cascade guide vane panel may be positioned between the inner opening and the outer opening when the translating panel is in the deployed position. The guide vanes may be angled and configured to direct airflow from within the inner wall in an outward and aftward direction relative to the outer wall in the deployed position.

In yet another embodiment of the invention, the nacelle may be configured to substantially encircle an aircraft engine and may have a forward end and an aft end opposite of the forward end. The nacelle may comprise two nacelle halves each having a forward end, an aft end, a top end, and a bottom end. The two nacelle halves may be configured to attach to an aircraft pylon at the top ends of the nacelle halves and to attach with each other at the bottom ends of the nacelle halves to cooperatively encircle the aircraft engine. Each of the nacelle halves may comprise an outer cowl, a translating panel translatable forward and aft relative to the outer cowl, two cascade guide vane panels fixed to the translating panel, translation guide components, a cascade support tray, and an actuator configured to actuate the translating panel and the cascade guide vane panel from a stowed position to a deployed position. The outer cowl may comprise an inner wall having an inner opening formed therethrough at the aft end of the nacelle and an outer wall surrounding the inner wall and converging with the inner wall at the aft end of the nacelle. The outer wall may have an outer opening formed therethrough and positioned to correspond with the inner opening at the aft end of the nacelle. The translating panel may be configured to cover the inner and outer openings in the stowed position and to translate aftward to the deployed position. The cascade guide vane panel may comprise a plurality of guide vanes and may be positioned between the inner and outer wall when the translating panel is in the stowed position. Furthermore, the cascade guide vane panel may be positioned between the inner opening and the outer opening when the translating panel is in the deployed position. The guide vanes may be angled and configured to direct airflow from within the inner wall in an outward and aftward direction relative to the outer wall in the deployed position. The translation guide components may be configured to extend in an aft-to-forward direction and may comprise a first guide component attached to the outer cowl and a second guide component attached to the translating panel and/or the cascade guide vane panel. The second guide component may also be slidably connected with the first guide component. The cascade support tray may be positioned between the two cascade guide vane panels and may fix the two cascade guide vane panels with each. The cascade guide tray may form a channel between the two cascade guide vane panels through which at least a portion of the actuator extends, such that the translatable element of the actuator may be fixed to the translating panel aft of the cascade support tray.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein:

FIG. 7 is a cross-sectional fragmentary view of the outer cowl, illustrating an actuator configured for translating the translating panel of FIG. 3;

FIG. 8 is a cross-sectional fragmentary view of the outer cowl, illustrating the actuator and the translating panel of FIG. 3 in the deployed position;

Figure 3:
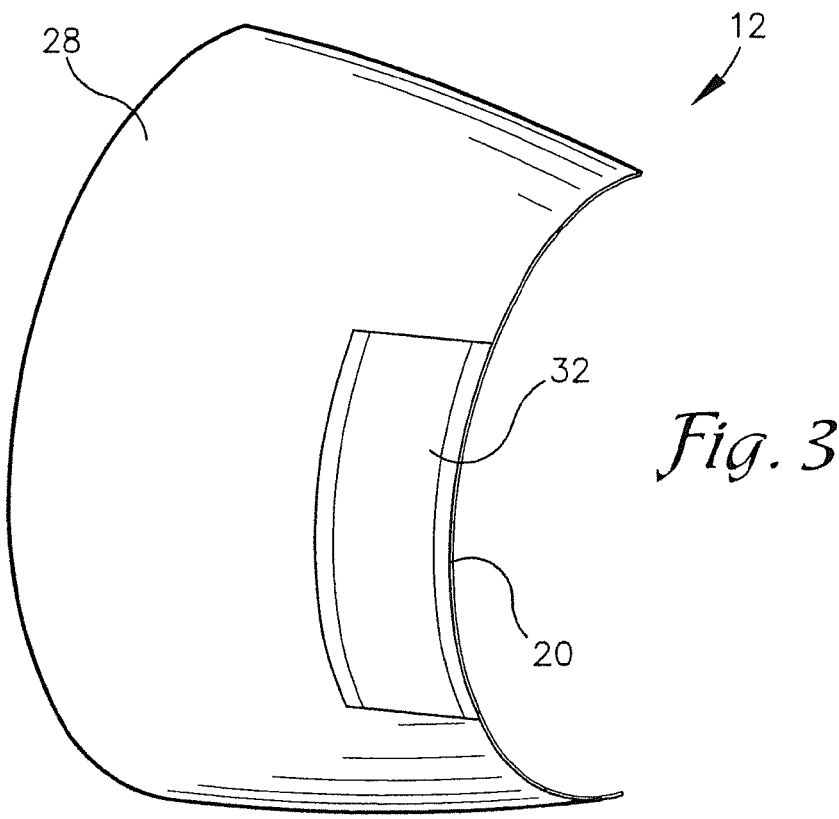
FIG. 3 is a side perspective view of one half of an outer cowl of the nacelle of FIG. 1 with a translating panel in a stowed position.
Figure 9:
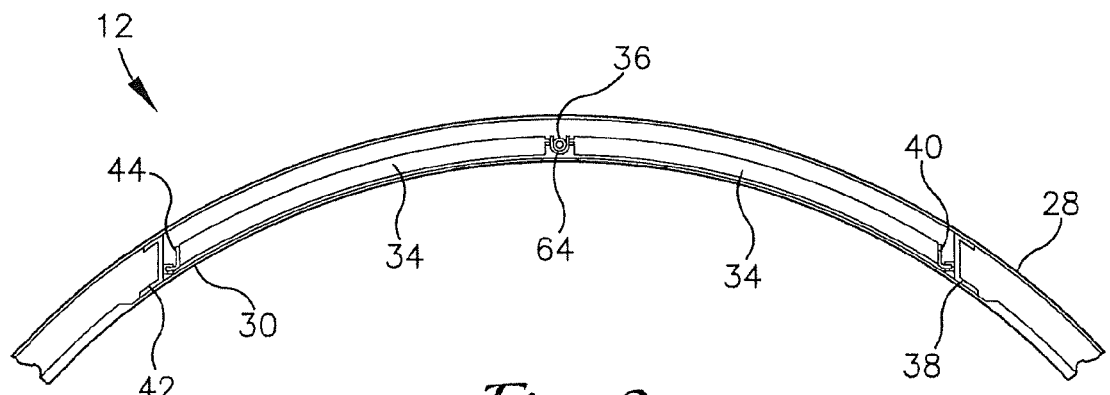
FIG. 9 is a cross-sectional fragmentary view of the outer cowl of FIG. 3, illustrating the actuator, cascade guide vane panels, and translation guide components.
Figure 10:
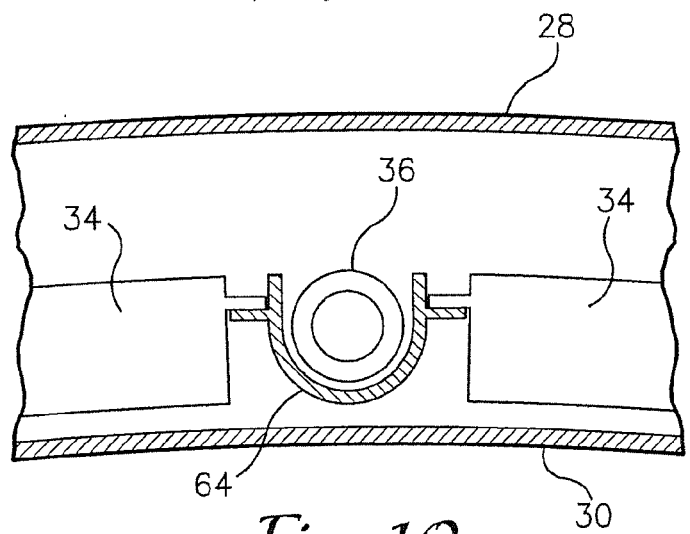
FIG. 10 is a magnified cross-sectional fragmentary view of the outer cowl of FIG. 9, illustrating a cascade support tray connecting two of the cascade guide vane panels.
Figure 11:
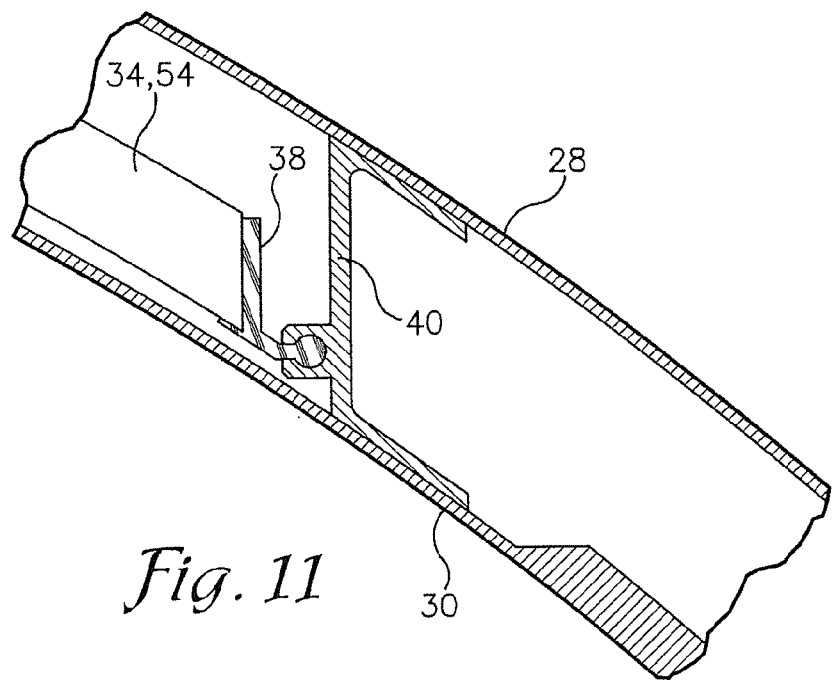
Figure 12:
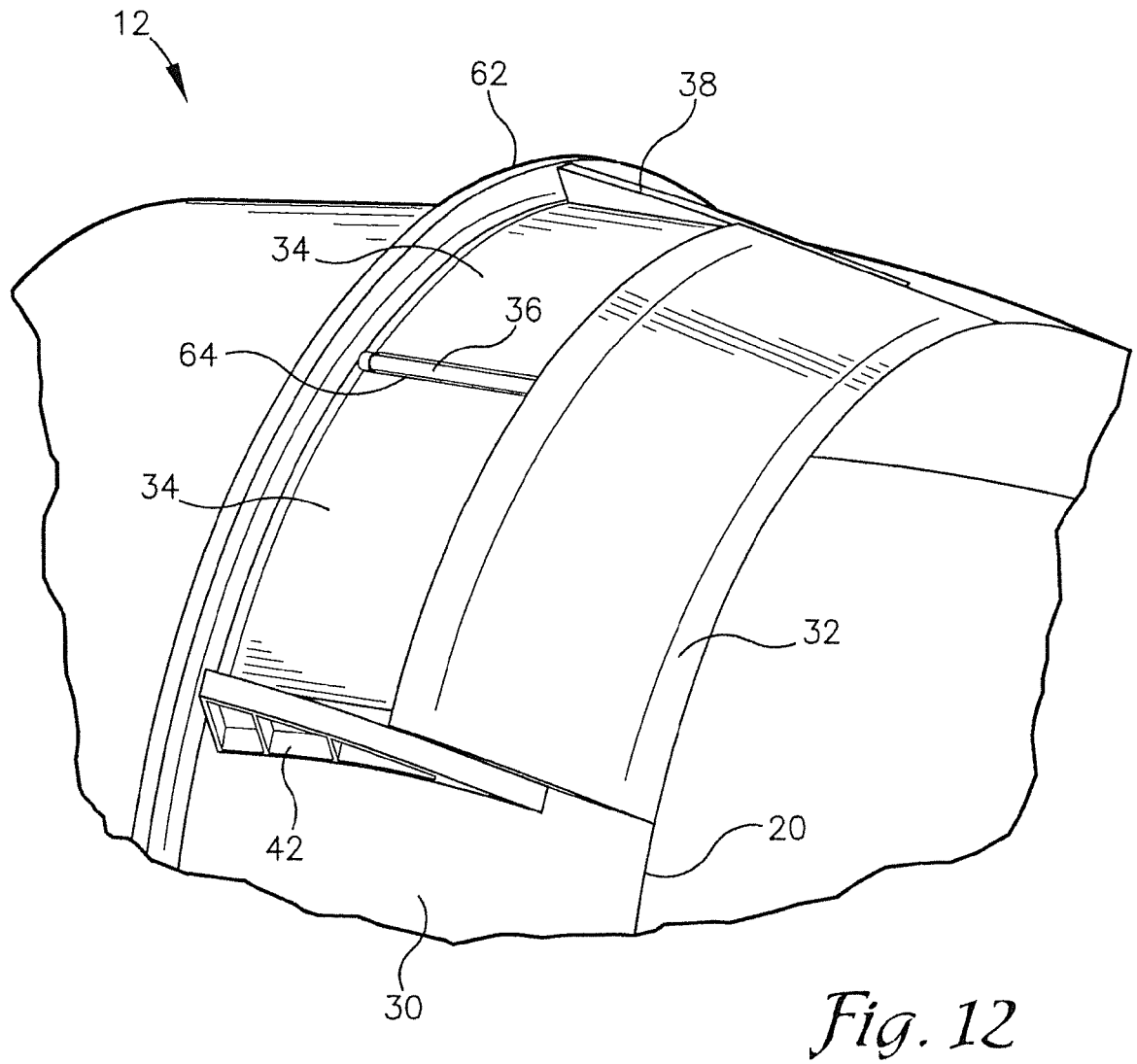

FIG. 11 is a magnified cross-sectional fragmentary view of the outer cowl of FIG. 9, illustrating some of the translation guide components slidably joining the cascade guide vane panels with inner and outer walls of the outer cowl; and FIG. 12 is a fragmentary perspective view of the outer cowl of FIG. 3 with the outer wall removed, illustrating the translating panel and the cascade guide vane panels in the stowed position.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
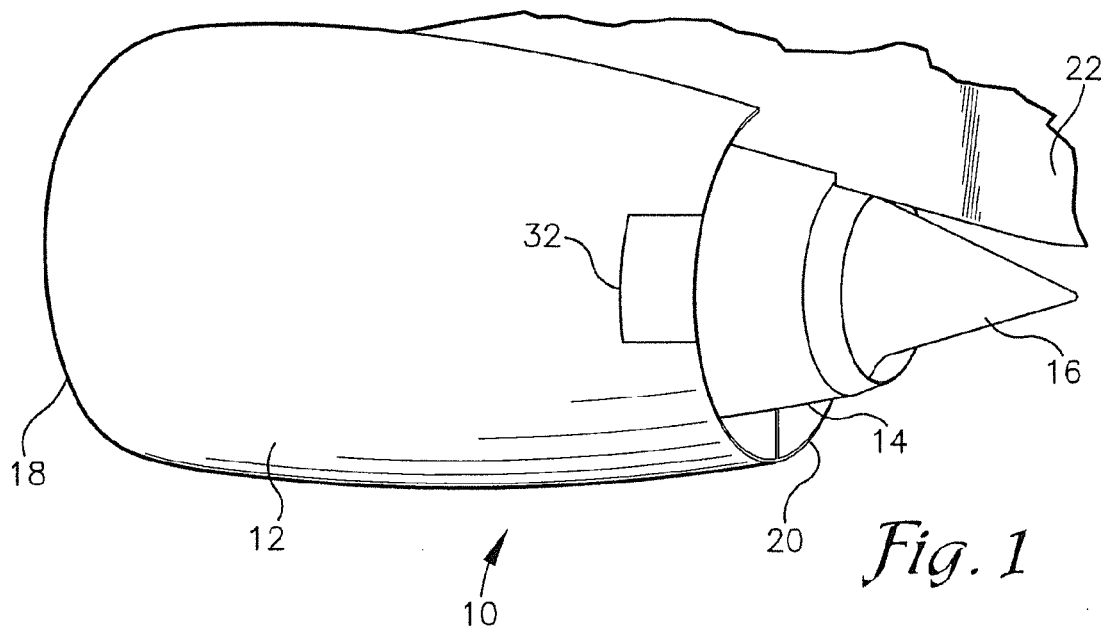
FIG. 1 is an elevation view of a nacelle constructed in accordance with an embodiment of the present invention.
Figure 2:
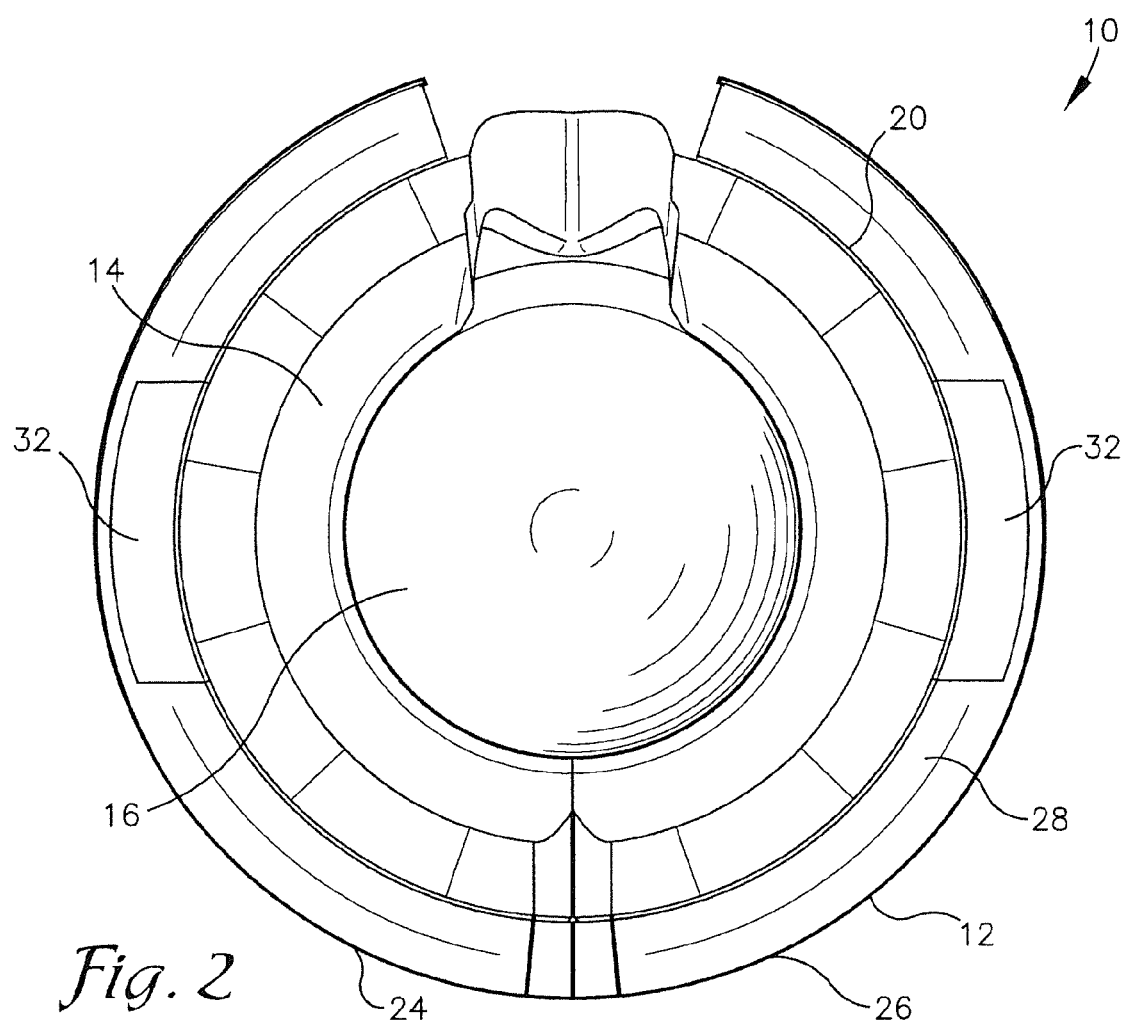
FIG. 2 is an aft end view of the nacelle of FIG. 1.

An aircraft nacelle 10 constructed in accordance with an embodiment of the present invention is illustrated in FIGS. 1 and 2 and broadly comprises an outer cowl 12 and an inner cowl 14 positioned inward of the outer cowl 12. The inner cowl 14 may substantially surround an engine 16 of an aircraft about an imaginary center axis, and the outer cowl 12 may substantially surround the inner cowl 14, forming a fan duct therebetween. The nacelle may have a forward end 18 and an aft end 20, as illustrated in FIG. 1, and air may flow between the inner cowl 14 and the outer cowl 12 in a generally forward-to-aft direction.

In some embodiments of the invention, nacelle 10 extends an entire 360 degrees around the engine or approximately 350 degrees around the engine. However, the nacelle 10 may extend more or less than 350 degrees around the engine 16 without departing from the scope of the present invention. The nacelle 10 may be attached to a pylon 22 of the aircraft. For example, the pylon 22 may span the remaining 10 degrees about the engine 16 not spanned by the 350-degree nacelle. However, the nacelle 10 may be attached to any structure and/or any portion of the aircraft without departing from the scope of the invention.

The nacelle 10 may be a single, substantially-continuous structure or may comprise two or more sections that are joined together. For example, the nacelle 10 may have a first nacelle half 24 and a second nacelle half 26, as illustrated in FIG. 2, each having a top end, a bottom end, a forward end, and an aft end. The nacelle halves 24,26 may each comprise half of the outer cowl 12 and half of the inner cowl 14. The nacelle halves 24,26 may each have curved or substantially C-shaped cross-sections. The nacelle halves 24,26 may each attach to the pylon 22 of the aircraft at their respective top ends and may be fixed to each other at their respective bottom ends, thus cooperatively surrounding the engine 16, along with the pylon 22.

The outer cowl 12 and the inner cowl 14 may each have a forward end and an aft end corresponding with the forward end 18 and aft end 20 of the nacelle 10, respectively. The space between the inner cowl 14 and the outer cowl 12 may be referred to herein as a fan duct. A cross-sectional diameter of the outer cowl 12 may substantially decrease or taper proximate the aft end of the outer cowl 12. Exit openings at or proximate to the aft end of the nacelle through which air or exhaust flowing between the outer cowl 12 and the inner cowl 14 exit the fan duct may be referred to herein as the nozzle. The total area of the exit openings may be referred to herein as the nozzle area, which may be varied by translating components of the nacelle 10, as described below.

The outer cowl 12 may have an outer wall 28, as illustrated in FIGS. 1-11 and an inner wall 30, as illustrated in FIGS. 7-11. The outer cowl 12 may attach to a lip extending from the outer wall 28 to the inner wall 30 at the forward end of the outer cowl 12. In some embodiments of the invention, a thrust reverser and/or various conventional thrust reverser components, such as a plurality of thrust-reversing vanes and/or thrust reverser actuators or actuating rams, may be housed between the outer wall 28 and the inner wall 30. Furthermore, the outer wall 22 and the inner wall 24 may converge at the aft end 20 of the nacelle 10 and may together form a single aft edge of the outer cowl 12.

Figure 6:
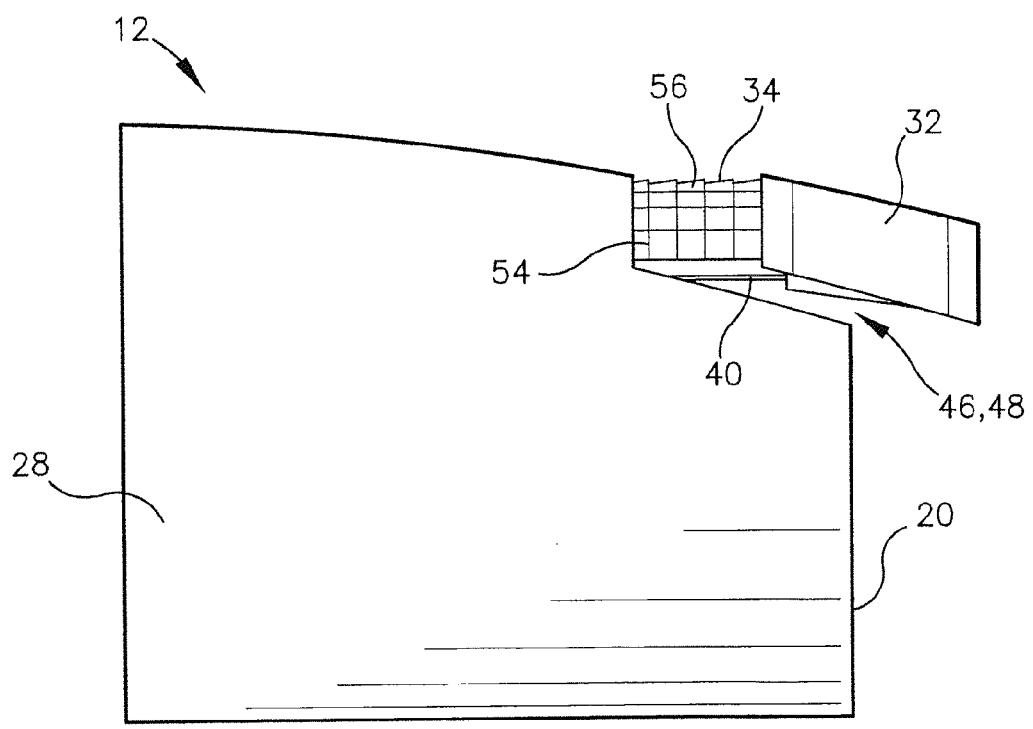
FIG. 6 is an elevation view of the half of the outer cowl of FIG. 4 with the translating panel in the deployed position.

As illustrated in FIGS. 3-12, the nacelle 10 of the present invention may further comprise at least one translating panel 32, at least one cascade guide vane panel 34, at least one actuator 36 configured to translate the translating panel 32 and the cascade guide vane panel 34 forward and aft relative to the outer cowl 12, and one or more translation guide components 38,40,42,44. The translating panel 32 may be a translatable portion of the outer cowl 12 located aft of the thrust reverser components at the aft end 20 of the nacelle 10. In a stowed position, the translating panel 32 may reside within both an inner opening 46 formed at the aft end of the outer cowl 12 through the inner wall 26 of the outer cowl 12 and an outer opening 48 formed at the aft end of the outer cowl 12 through the outer wall 24 of the outer cowl 12, as illustrated in FIGS. 6 and 8.

The inner opening 46, the outer opening 48, and the translating panel 32 configured to fit therein may be of any size, shape, and dimensions. In some embodiments of the invention, the inner and outer openings 46,48 may be substantially rectangular in shape, having a greater length than width. The length of the rectangular-shaped inner and outer openings 46,48 may extend in a circumferential direction and may be substantially parallel with the aft end 20 of the nacelle 10 or outer cowl 12. Corresponding ones of the inner and outer openings 46,48 may be radially aligned with each other relative to the nacelle 10.

In some embodiments of the invention, there may be two sets of inner and outer openings 46,48, one formed into each of the nacelle halves 24,26, each having a corresponding translating panel 32 resting therein in the stowed position. In this embodiment of the invention, the two translating panels 32 and two sets of inner and outer openings 46,48 may be spaced apart circumferentially from each other at the aft end 20 of the nacelle 10 and positioned approximately 180-degrees apart from each other about the nacelle 10. For example, each set of the inner and outer openings 46,48 and their corresponding translating panel 32 may be positioned approximately mid-way between the top end and the bottom end of their corresponding nacelle half 24,26, as illustrated in FIG. 2.

The translating panel 32 may have a substantially V-shaped or triangular cross-section when cut along a forward-to-aft extending axis. For example, as illustrated in FIGS. 7 and 8, the translating panel may comprise a first wall 50 having an outer surface configured to rest flush with the outer wall 28 in the stowed position and a second wall 52 having an outer surface configured to rest flush with the inner wall 30 in the stowed position, as illustrated in FIGS. 7 and 8. The first wall 50 and the second wall 52 may converge at the aft end 20 of the nacelle 10 just as the outer and inner walls 28,30 converge with each other at the aft end 20 of the nacelle 10.

The translating panel 32 may have a length in a circumferential direction relative to the outer cowl 12 and a width in a forward-to-aft direction relative to the outer cowl 12. For example, the length may be between approximately 30 inches and 60 inches, and the width may be between approximately 10 inches and 30 inches. Furthermore, the translating panel 32 may be configured to translate by an amount less than the width of the translating panel. For example, the translating panel 32 may be configured to translate 5 inches to 20 inches aftward relative to the outer cowl 12. The length of the translating panel 32 may be significantly smaller than a total circumference of the outer cowl 12 and/or significantly smaller than a total length in a circumferential direction of the nacelle half 24,26 associated with the particular translating panel 32. In some embodiments of the invention, the translating panel 32 or translating panels may circumferentially span less than 35% of the aft end 20 of the nacelle 10. For example, at the aft end 20 of the nacelle 10, a length of a first translating panel may comprise 10% to 35% of the total length in the circumferential direction of the first nacelle half 24. Likewise, at the aft end 20 of the nacelle 10, the length of a second translating panel may comprise 10% to 35% of the total length in the circumferential direction of the second nacelle half 26.

Figure 4:
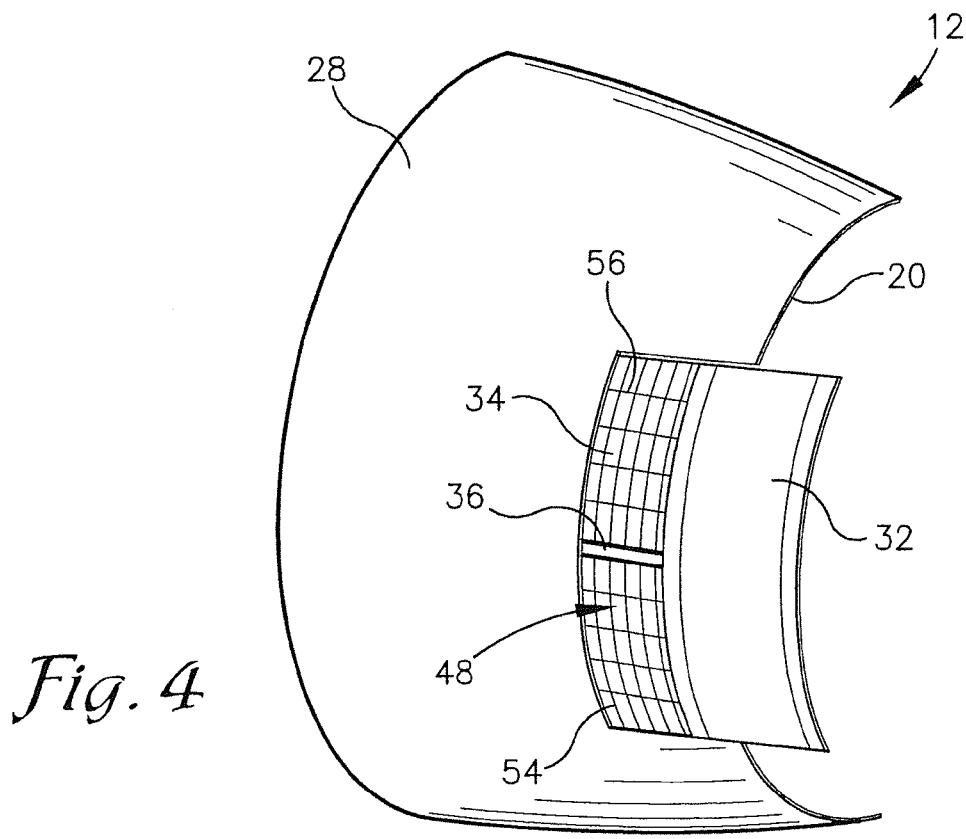
FIG. 4 is a side perspective view of the one half of the outer cowl of FIG. 3 with the translating panel in a deployed position.
Figure 5:
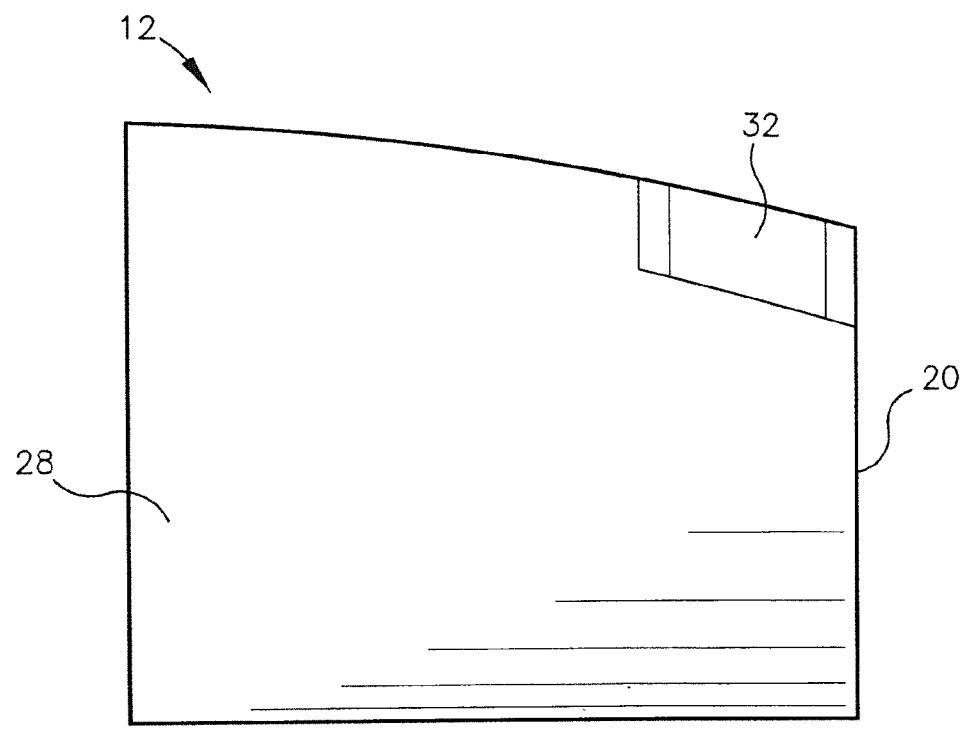
FIG. 5 is an elevation view of the half of the outer cowl of FIG. 3 with the translating panel in the stowed position.

The cascade guide vane panel 34 may comprise a plurality of guide vanes 54 in a cascade arrangement spaced apart from and parallel with each other and angled in a substantially aftward direction, as illustrated in FIG. 6. These guide vanes 54 may be shaped and/or sized similar to traditional thrust-reverser vanes, except that the guide vanes 54 described herein are positioned and configured to direct airflow aftward, not forward. For example, as illustrated in FIG. 6, the guide vanes 54 may be tilted with an outer edge of each of the guide vanes 54 extending further aftward than an inner edge thereof. The guide vanes 54 may be made of any conventional material. In some embodiments of the invention, the cascade guide vane panel 34 may comprise a substantially rectangular-shaped block of a plurality of the guide vanes 54 attached substantially parallel with each other and curved to substantially match a contour of the outer cowl 12. In some embodiments of the invention, framing pieces 56 may hold the guide vanes 54 in place relative to each other. For example, as illustrated in FIGS. 4 and 6, the framing pieces 56 may be fixed or integrally formed with the guide vanes 54 and arranged substantially perpendicular relative to the guide vanes 54.

The actuator 36, as illustrated in FIGS. 7-10, may be configured to translate the translating panel 32 in a forward-to-aft direction into the deployed position and then in an aft-to-forward direction into the stowed position. The actuator 36 may be a linear electric actuator or some other suitable device. Specifically, the actuator 36 may be hydraulic, pneumatic, or electrical, such as an electrical driven lead-screw type actuator, as depicted in FIGS. 7 and 8. The actuator 36 may include a fixed element 58 fixed relative to the outer cowl 12 and a translatable element 60 fixed relative to the translating panel 32 and/or the cascade guide vane panel 34. For example, the fixed element 58 may be mounted or otherwise fixed to a thrust reverser aft cascade support ring 62, as illustrated in FIG. 12. The aft cascade support ring 62 may be fixed to the outer and/or inner walls 28,30 of the nacelle 10 aft of the thrust-reversing vanes. In some embodiments of the invention, as illustrated in FIGS. 7 and 8, the translatable element 60 may have a forward end and an aft end, with the aft end fixed to the translating panel 32. The translating panel 32 and/or the cascade guide vane panel 34 fixed to the translating panel 32 may glide forward and aft along the translation guide components 38-44, as described below, via actuation of the actuator 36. The actuator 36 may receive power to extend or retract the translatable element 60 from a variable area fan nozzle (VAFN) control unit communicably coupled with an electronic engine control (EEC) unit, programmed according to the needs of the engine 16 or aircraft manufacturer.

In some embodiments of the invention, the cascade guide vane panel 34 may comprise two or more cascade guide vane panels identical to the cascade guide vane panel 34 described above. Portions of the actuator 36 may extend or pass between two cascade guide vane panels, as illustrated in FIG. 9, with the two cascade guide vane panels fixed with each other via a cascade support tray 64. The cascade support tray 64 may have a substantially U-shaped cross-section, or any other cross-sectional shape providing a channel between the cascade guide vane panels 34 through which the fixed and/or translatable elements 58,60 of the actuator 36 may extend in a substantially forward-to-aft direction. For example, the aft end of the translatable element 60 may be fixed to the translating panel 32 and may have a length extending through the cascade support tray 64.

In some embodiments of the invention, the actuator 36 may comprise a plurality of actuators, each identically to the actuator 36 described above. Each of the plurality of actuators may correspond with one of a plurality of translating panels, each identical to the translating panel 32 described above. For example, a first actuator may be configured to actuate the first translating panel relative to the first nacelle half 24 and a second actuator may be configured to actuate the second translating panel relative to the second nacelle half 26. The plurality of actuators may be mechanically, electrically, and/or communicatively connected with each other, such as via a conduit or drive cable. This may allow simultaneous or synchronous opening and closing of all of the translating panels. The translating panels and/or the plurality of actuators may also all be locked from a single location, thus assuring no uncommanded movement of any one of the translating panels.

The translation guide components 38-44, as illustrated in FIGS. 9 and 11, may comprise a first guide component 38 fixed to the thrust reverser aft cascade support ring 62, the outer wall 28, and/or the inner wall 30 of the outer cowl 12 and a second guide component 40 fixed to the translating panel 32 and/or the cascade guide vane panel 34 or panels. The second guide component 40 may be slidably or rollably attached to the first guide component 38. For example, the first guide component 38 may comprise a track and the second guide component 40 may comprise a slider configured to slidably engage the track, as illustrated in FIG. 11. In some embodiments of the invention, as illustrated in FIG. 9, the actuator 36 may be substantially centered relative to the length of the translating panel 32, and two pairs of guide components 38,40,42,44 may be located at either end or opposing edges of the translating panel 32, extending width-wise relative to the translating panel 32.

Each of the first guide components 38,42 (e.g., tracks) and the second guide components 40,44 (e.g., sliders) may have a length spanning the width of the translating panel 32 and/or the width of the cascade guide vane panel 34 fixed to the translating panel 32, as measured from the aft end 20 of the nacelle 10 in a forward direction. Additionally or alternatively, the length of the guide components 38-44 may be substantially directly proportional to the maximum desired amount of translation of the translating panel 32. The amount of desired translation may be determined by an area of the cascade guide vane panel 34 desired to be exposed to the air flow. The first guide components 38,42 comprising the track may also be configured to form seals between the outer and inner walls 28,30, as illustrated in FIGS. 11 and 12, such that air flow through the cascade guide vane panel 34 in the deployed position does not flow between the outer and inner walls 28,30 of the outer cowl 12.

In operation, actuation of the actuator 36 may cause the translatable element 60 of the actuator 36 to slide aftward, away from the fixed element 58 of the actuator 36, thereby sliding the translating panel 32 aftward along the translation guide components 38-44, exposing the cascade guide vane panel 34. Thus, aftward actuation of the translatable element 60 of the actuator 36 may move the translating panel 32 and the cascade guide vane panel 34 fixed to the translating panel 32 from the stowed position to the deployed position. Likewise, forward actuation of the translatable element 60 of the actuator 36 toward the fixed element 58 of the actuator 36 may move the translating panel 32 and its associated cascade guide vane panel 34 or panels from the deployed position back to the stowed position.

Air may flow between the inner cowl 14 and the outer cowl 12 in a forward-to-aft direction out through the nozzle of the fan duct. When the translating panel 32 is actuated to the deployed position, air flowing toward the nozzle may also flow outward and substantially aftward from within the fan duct through the inner and outer openings 46,48 of the outer cowl 12. Specifically, the air flow may be directed substantially outward and aftward by the cascade guide vanes panel 34 or panels exposed between the inner and outer openings 46,48 in the deployed position, as illustrated in FIGS. 4, 6, and 8. Actuating the translating panel 32 aftward creates a similar effect to increasing the nozzle area of the nacelle 10. For example, the translating panel 32 on each of the nacelle halves 20,22 may be actuated to the deployed position for take off and actuated to the stowed position during flight at cruising altitudes.

In some embodiments of the invention, the translating panel 32 or translating panels may be actuated by varying or discrete amounts between a fully stowed and fully deployed position. A portion of air flowing through the nacelle 10 may be allowed to escape upstream of the fan duct nozzle and is directed along a specified direction to produce thrust. The remaining air flowing through the nacelle 10 may exit at the nozzle or aft end 20 of the nacelle 10 and through the cascade guide vane panel 34 or panels. The translating panel 32 or panels may be actuated to two or more discrete positions, such as the stowed position, the deployed position, and/or an intermediate position. For example, the nozzle area may be expanded to 110% or 115% of the original nozzle area by translation of the translating panels described herein. Additionally or alternatively, feedback loops, sensors, and/or linear variable differential transformers (LVDTs) may be added to the invention and the translating panel 32 may be infinitely variable between the stowed and deployed positions depending on the feedback received.

The present invention is advantageous over various prior art nacelles, which provides for no nozzle area variation. In the deployed position, the present invention also allows for vectoring of fan duct air escaping through the nozzle, which is required to gain maximum nozzle efficiency in all geometric configurations.

Although the invention has been described with reference to the preferred embodiment illustrated in the attached drawing figures, it is noted that equivalents may be employed and substitutions made herein without departing from the scope of the invention as recited in the claims. For example, the concept described herein could be applied to any fluid flow apparatus where nozzle exit area variation is desired, such as with a primary exhaust nozzle exit area variation.

Having thus described various embodiments of the invention, what is claimed as new and desired to be protected by Letters Patent includes the following:

1. A nacelle configured to surround an aircraft engine, the nacelle having a forward end and an aft end opposite of the forward end, the nacelle comprising:
   an outer cowl comprising:
      an inner wall having at least one inner opening formed therethrough at the aft end of the nacelle, and
      an outer wall surrounding the inner wall and converging with the inner wall at the aft end of the nacelle, the outer wall having at least one outer opening formed therethrough and positioned to correspond with the inner opening at the aft end of the nacelle;
   a translating panel configured to cover the inner and outer openings in a stowed position and to translate aftward to a deployed position;
   a cascade guide vane panel fixed to the translating panel and comprising a plurality of guide vanes, wherein the cascade guide vane panel is positioned between the inner and outer wall when the translating panel is in the stowed position and wherein the cascade guide vane panel is positioned between the inner opening and the outer opening when the translating panel is in the deployed position, wherein the plurality of guide vanes are angled and configured to direct airflow from within the inner wall in an outward and aftward direction relative to the outer wall in the deployed position; and
   an actuator configured to actuate the translating panel and the cascade guide vane panel from the stowed position to the deployed position.

2. The nacelle of claim 1, further comprising an inner cowl spaced apart from and located inward of the outer cowl, wherein the outer cowl and the inner cowl are configured such that air flows in a forward-to-aft direction between the inner and outer cowls.

3. The nacelle of claim 1, further comprising translation guide components configured to slidably support at least one of the translating panel and the cascade guide vane panel relative to the outer cowl.

4. The nacelle of claim 3, wherein the translation guide components are located at opposing edges of the translating panel.

5. The nacelle of claim 1, wherein the translating panel comprises an inner wall and an outer wall, wherein the inner wall of the translating panel rests flush with the inner wall of the outer cowl within the inner opening in the stowed position and the outer wall of the translating panel rests flush with the outer wall of the outer cowl within the outer opening in the stowed position.

6. The nacelle of claim 1, wherein the translating panel circumferentially spans less than 35 percent of the aft end of the nacelle.

7. The nacelle of claim 1, wherein the nacelle and the outer cowl are divided along an axis extending in a forward-to-aftward direction into two halves, wherein each of the halves is configured to extend less than 180 degrees around the aircraft engine, wherein the translating panel circumferentially spans between 10 and 35 percent of one of the halves of the aft end of the nacelle.

8. The nacelle of claim 7, wherein the cascade guide vane panel comprises two cascade guide vane panels fixed with each other by a cascade support tray, wherein the cascade support tray forms a channel between the two cascade guide vane panels through which at least a portion of the actuator extends, wherein the translatable element is fixed to the translating panel aft of the cascade support tray.

9. The nacelle of claim 1, wherein the actuator comprises a fixed element and a translatable element configured to slide toward and away from the fixed element, wherein the translatable element is fixed to at least one of the translating panel and the cascade guide vane panel.

10. A nacelle configured to encircle an aircraft engine, the nacelle having a forward end and an aft end opposite of the forward end, the nacelle comprising:
   two nacelle halves each having a forward end, an aft end, a top end, and a bottom end, wherein the two nacelle halves are configured to attach to an aircraft pylon at the top ends of the nacelle halves and to attach with each other at the bottom ends of the nacelle halves to cooperatively encircle the aircraft engine, wherein each of the nacelle halves comprises:
      an outer cowl comprising:
         an inner wall having at least one inner opening formed therethrough at the aft end of the nacelle, and
         an outer wall spaced apart from and outward of the inner wall and converging with the inner wall at the aft end of the nacelle, the outer wall having at least one outer opening formed therethrough and positioned to correspond with the inner opening at the aft end of the nacelle;
      a translating panel configured to cover the inner and outer openings in a stowed position and to translate aftward to a deployed position;
      a cascade guide vane panel fixed to the translating panel and comprising a plurality of guide vanes, wherein the cascade guide vane panel is positioned between the inner and outer wall when the translating panel is in the stowed position and wherein the cascade guide vane panel is positioned between the inner opening and the outer opening when the translating panel is in the deployed position, wherein the plurality of guide vanes are angled and configured to direct airflow from within the inner wall in an outward and aftward direction relative to the outer wall in the deployed position; and
      an actuator configured to actuate the translating panel and the cascade guide vane panel from the stowed position to the deployed position.

11. The nacelle of claim 10, wherein each of the nacelle halves further comprise translation guide components extending in an aft-to-forward direction, the translation guide components comprising a first guide component attached to the outer cowl and a second guide component attached to at least one of the translating panel and the cascade guide vane panel and slidably connected with the first guide component.

12. The nacelle of claim 10, wherein the translating panel comprises an inner wall and an outer wall, wherein the inner wall of the translating panel rests flush with the inner wall of the outer cowl within the inner opening in the stowed position and the outer wall of the translating panel rests flush with the outer wall of the outer cowl within the outer opening in the stowed position.

13. The nacelle of claim 10, wherein the translating panel circumferentially spans between 10 and 35 percent of the aft end of the nacelle half.

14. The nacelle of claim 10, wherein the actuator comprises a fixed element and a translatable element configured to slide toward and away from the fixed element, wherein the fixed element is fixed relative to the outer cowl and the translatable element is fixed to at least one of the translating panel and the cascade guide vane panel.

15. The nacelle of claim 14, wherein the cascade guide vane panel comprises two cascade guide vane panels fixed with each other by a cascade support tray, wherein the cascade support tray forms a channel between the two cascade guide vane panels through which at least a portion of the actuator extends, wherein the translatable element is fixed to the translating panel aft of the cascade support tray.

16. The nacelle of claim 10, wherein the translating panel is positioned approximately mid-way between the top end and the bottom end of the nacelle half.

17. A nacelle configured to encircle an aircraft engine, the nacelle having a forward end and an aft end opposite of the forward end, the nacelle comprising:
  two nacelle halves each having a forward end, an aft end, a top end, and a bottom end, wherein the two nacelle halves are configured to attach to an aircraft pylon at the top ends of the nacelle halves and to attach with each other at the bottom ends of the nacelle halves to cooperatively encircle the aircraft engine, wherein each of the nacelle halves comprises:
    an outer cowl comprising:
      an inner wall having at least one inner opening formed therethrough at the aft end of the nacelle, and
      an outer wall spaced apart from and outward of the inner wall and converging with the inner wall at the aft end of the nacelle, the outer wall having at least one outer opening formed therethrough and positioned to correspond with the inner opening at the aft end of the nacelle;
    a translating panel configured to cover the inner and outer openings in a stowed position and to translate aftward to a deployed position;
    two cascade guide vane panels fixed to the translating panel and each comprising a plurality of guide vanes positioned between the inner and outer wall when the translating panel is in the stowed position and positioned between the inner opening and the outer opening when the translating panel is in the deployed position, wherein the plurality of guide vanes are angled and configured to direct airflow from within the inner wall in an outward and aftward direction relative to the outer wall in the deployed position;
    translation guide components extending in an aft-to-forward direction, the translation guide components comprising a first guide component attached to the outer cowl and a second guide component attached to at least one of the translating panel and the cascade guide vane panel and slidably connected with the first guide component;
    an actuator configured to actuate the translating panel and the cascade guide vane panel from the stowed position to the deployed position; and
    a cascade support tray positioned between and fixing the two cascade guide vane panels with each, wherein the cascade support tray forms a channel between the two cascade guide vane panels through which at least a portion of the actuator extends, wherein the translatable element is fixed to the translating panel aft of the cascade support tray.

18. The nacelle of claim 17, wherein the translating panel circumferentially spans between 10 and 35 percent of the aft end of the nacelle half.

\* \* \* \* \*